Figure 7:
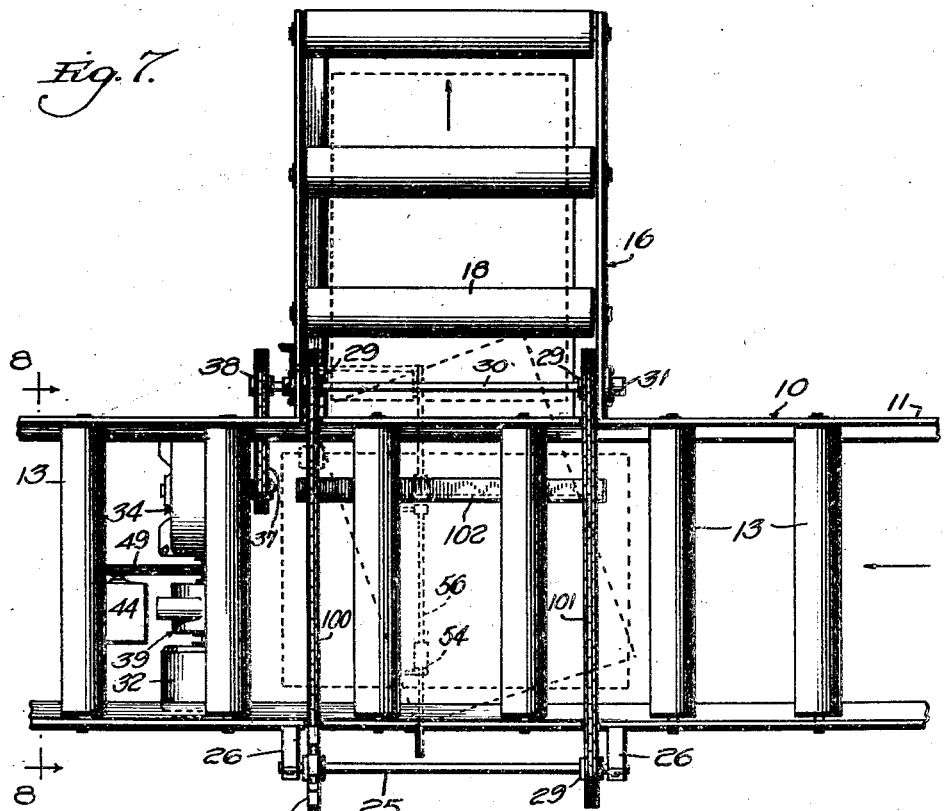

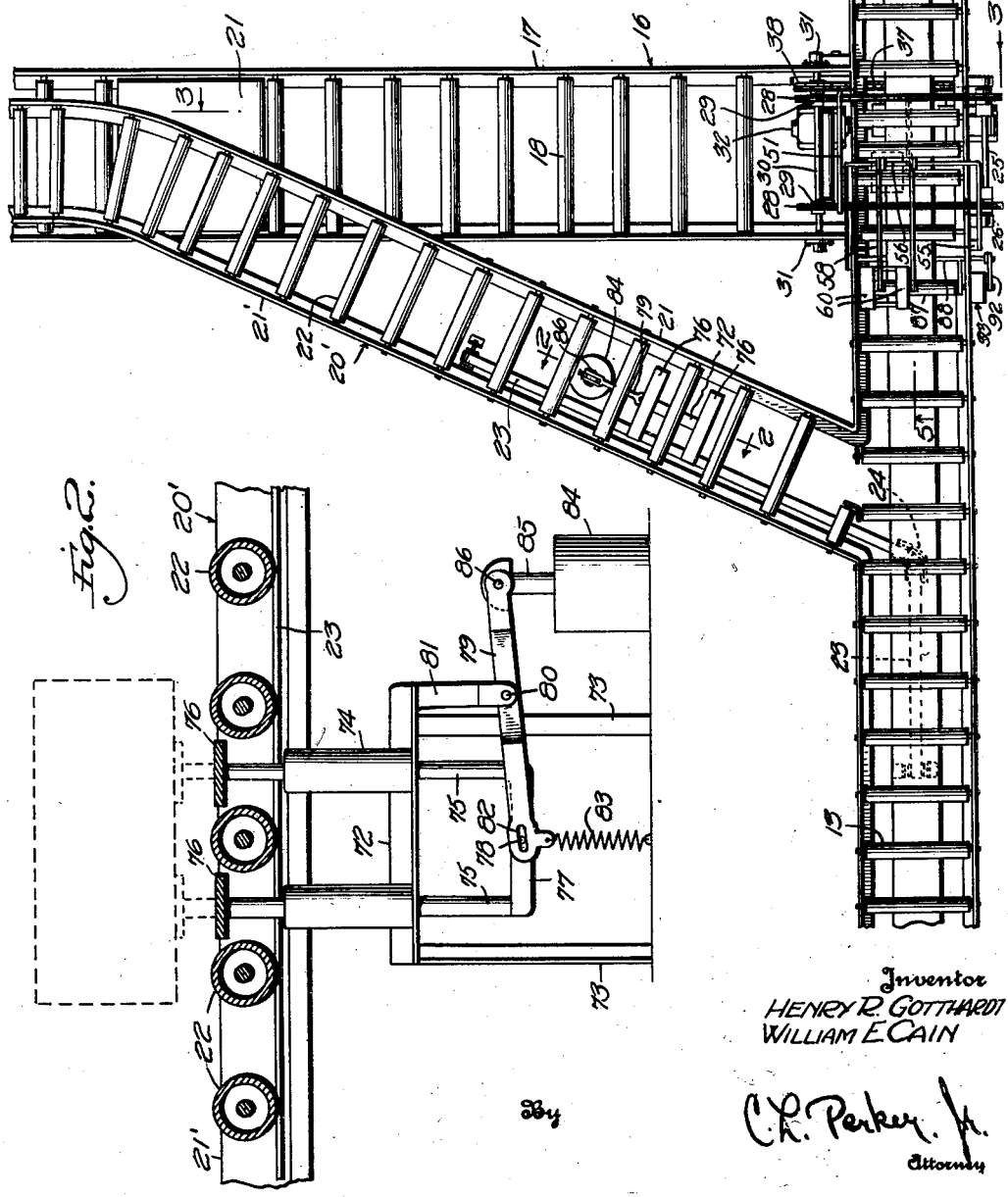

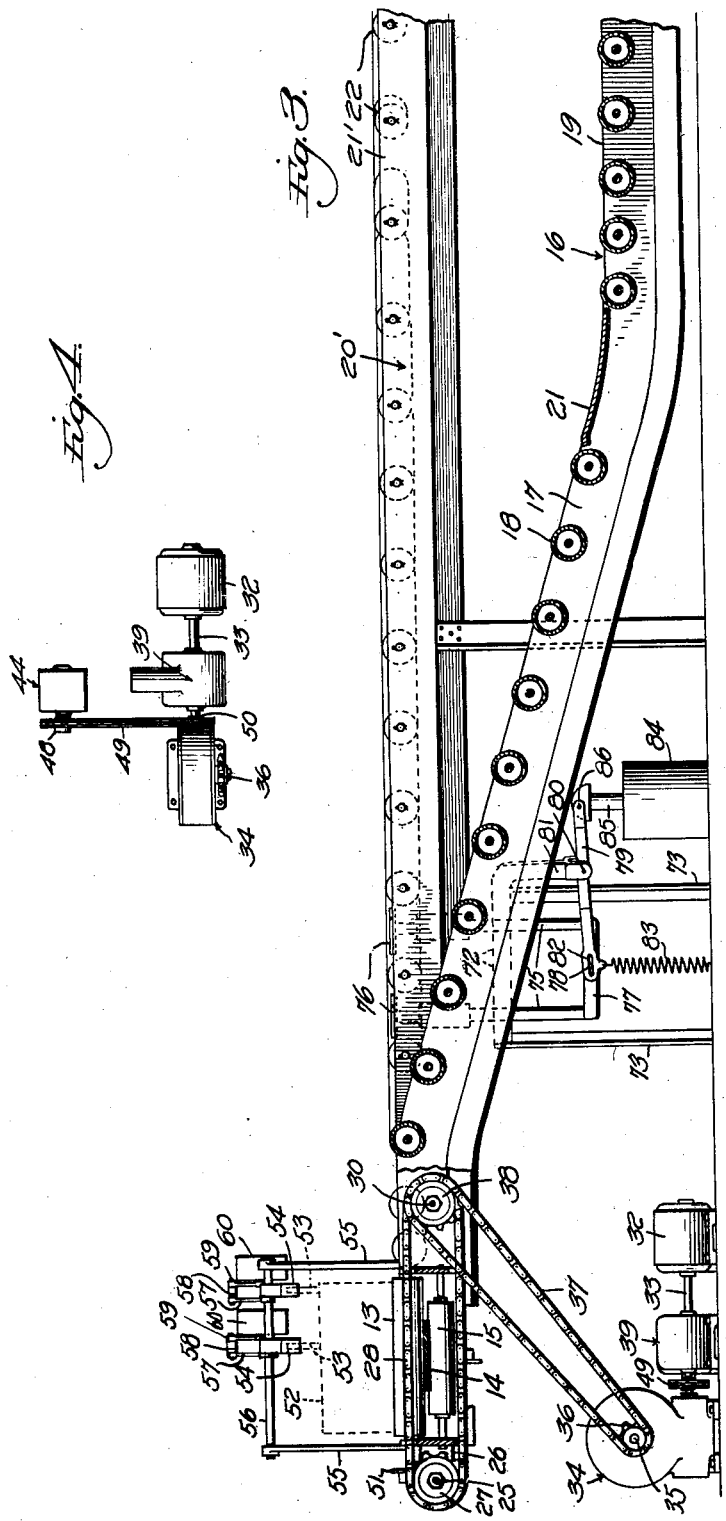

April 25, 1933. H. R. GOTTHARDT ET AL 1,905,379
CONVEYING SYSTEM
Filed July 13, 1931 4 Sheets-Sheet 3
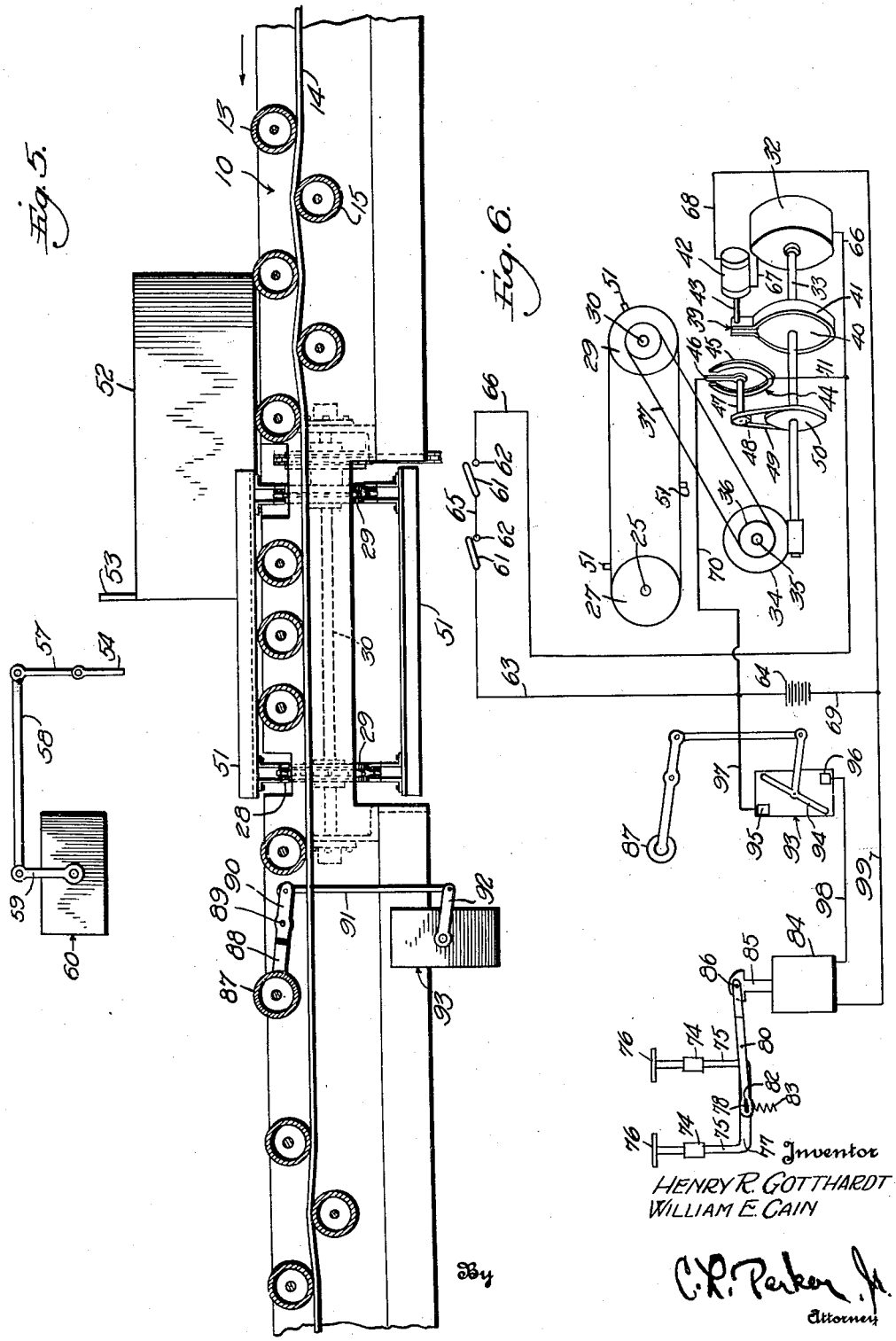
Inventor
HENRY R. GOTTHARDT
WILLIAM E. CAIN
By
C. L. Parker Jr.
Attorney April 25, 1933. H. R. GOTTHARDT ET AL 1,905,379
CONVEYING SYSTEM
Filed July 13, 1931 4 Sheets-Sheet 4

Inventor
HENRY R. GOTTHARDT
WILLIAM E. CAIN

Patented Apr. 25, 1933

1,905,379

UNITED STATES PATENT OFFICE

HENRY R. GOTTHARDT, OF LOUISVILLE, KENTUCKY, AND WILLIAM E. CAIN, OF JEFFERSONVILLE, INDIANA, ASSIGNORS TO LOGAN CO. INC., OF LOUISVILLE, KENTUCKY, A CORPORATION OF KENTUCKY

CONVEYING SYSTEM

Application filed July 13, 1931. Serial No. 550,546.

This invention relates to conveying systems.

It frequently is desirable to provide means associated with a main conveyor line for deflecting articles therefrom to selected branch conveyors in accordance with the desired destinations of the articles. It also is sometimes desirable to provide means for transferring articles to a main conveyor from intermediate points therealong, such as from points adjacent the branch conveyors to which articles are selectively discharged. Conveyor systems of this character have been developed which have been more or less satisfactory according to the particular use to which they are put. For example, deflecting switches which extend around a curve to take the articles from a main conveyor ordinarily are satisfactory where plenty of floor space is available but are not particularly satisfactory when floor space is limited.

Moreover, in cases where branch supply conveyors and selective take-off branch conveyors are associated with a main conveyor, difficulty sometimes is encountered in preventing interference between an article traveling on the main conveyor and an article being transferred to the main conveyor from one of the branch supply conveyors.

The present invention relates generally to a conveying system wherein both take-off and supply branches are associated with the main conveyor, and an important object of the invention is to provide a novel form of take-off means for transferring articles from the main conveyor to branch conveyors.

A further object is to provide automatic means for the take-off device which is adapted to reset itself ready for the next article after completing the transference of an article from the main conveyor to one of the take-off branches.

A further object is to provide take-off means of the character referred to which is automatically operated by an article or carrier traveling on the main conveyor.

A further object is to provide endless chain deflecting means for transferring articles from a main conveyor to a branch conveyor, and to provide automatic means for resetting the endless chains and associated elements in proper position after an article has been transferred, to place the apparatus in condition for deflecting a following article intended to be transferred to the same branch conveyor.

A further object is to provide adjacent take-off and supply conveyors associated with a main conveyor, and to provide means for preventing a package traveling on the supply conveyor toward the main conveyor from interfering with an article traveling therealong.

A further object is to provide automatic means for elevating an article traveling on a supply conveyor toward the main conveyor if such article is approaching the main conveyor at such a time as to interfere with a second article traveling therealong.

A further object is to provide a novel take-off device for a main conveyor which is automatically operative for transferring an article from the main conveyor at right angles thereto, and for turning the article at right angles at the take-off point, so that the article will travel on the associated take-off conveyor in the same direction as it traveled with respect to the main conveyor.

Other objects and advantages of the invention will become apparent during the course of the following description.

Figure 8:
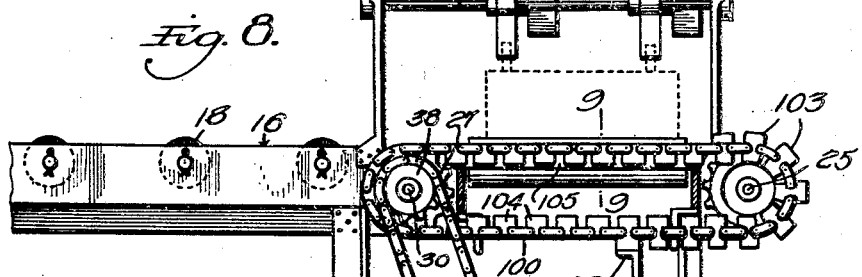
Figure 9:
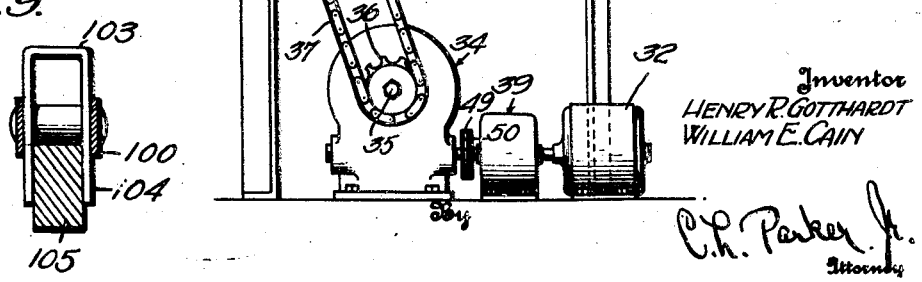

In the drawings we have shown several embodiments of the invention. In this showing, Figure 1 is a plan view, Figure 2 is an enlarged fragmentary vertical sectional view on line 2—2 of Figure 1, Figure 3 is a section taken substantially on line 3—3 of Figure 1, Figure 4 is a plan view of the drive mechanism for the take-off device, Figure 5 is a vertical sectional view on line 5—5 of Figure 1, Figure 6 is a diagrammatic view showing the electrical circuits, Figure 7 is an enlarged fragmentary plan view of a modified form of the apparatus, Figure 8 is a section on line 8—8 of Figure 7, and, Figure 9 is an enlarged detail sectional view on line 9—9 of Figure 8.

Referring to Figures 1, 2 and 5, the numeral 10 designates a main conveyor line as a whole, shown in the present instance as being of the live roller type. In such type, the main conveyor comprises side rails 11 and 12 between which are journalled load supporting rollers 13 of the usual type. These rollers are adapted to be driven by an endless belt 14 maintained in driving engagement with the rollers 13 by idler rollers 15, as clearly shown in Figure 5. The rollers 15 have been omitted from Figure 1 in the interest of clarity.

Means to be described are employed for deflecting or transferring articles from the main conveyor to either of a plurality of branch or take-off conveyors one of which is illustrated as a whole by the numeral 16. The take-off conveyors may be of any desired type, and the take-off conveyor illustrated is of the gravity type in which side rails 17 rotatably support gravity rollers 18. In the form of the apparatus illustrated, the take-off conveyor includes a substantially horizontal portion 19 and an inclined portion 20 leading from the main conveyor to the horizontal portion 19, and at the angle of the two portions of the conveyor a curved guide plate 21 is provided in order to prevent articles traveling on the branch conveyor from having their forward edges strike against the first roller of the horizontal portion of the take-off conveyor.

A supply conveyor indicated as a whole by the numeral 20' is preferably associated with each take-off conveyor and is operative for transferring articles to the main conveyor from intermediate points therealong. Each supply conveyor includes side rails 21' between which are journalled rollers 22, and the rollers adjacent the main conveyor are preferably driven by an endless belt 23. This belt passes over suitable pulley means 24 of any desired type to turn it at an angle to extend beneath and in contact with certain of the rollers 15 of the main conveyor to be driven thereby.

Adjacent the rail 12 of the main conveyor, and at a point opposite the branch conveyor 16, a shaft 25 is journalled in bearings 26 carried by the side rails 12. This shaft carries sprockets 27 about which pass endless chains 28, as clearly shown in Figure 3. The other ends of these chains pass around sprockets 29 carried by a shaft 30 journalled in bearings 31 carried by the rails 17 of the take-off conveyor.

Referring to Figure 3, the numeral 32 designates a motor forming the source of power for driving the chains 28. This motor has its shaft 33 extending through a reduction gearing of any suitable type indicated as a whole by the numeral 34. A take-off shaft 35 extends from the casing of the speed reduction gearing and carries a sprocket 36. A chain 37 passes around the sprocket 36 and around a sprocket 38 carried by the shaft 30. Accordingly it will be apparent that the motor 32 is adapted to drive the chains 28 at a substantially reduced speed.

A brake mechanism indicated as a whole by the numeral 39 operates to stop the shaft 33 promptly whenever the source of current, to be referred to, is disconnected from the motor 32. The brake mechanism is illustrated diagrammatically in Figure 6 as comprising a drum 40 surrounded by a brake band 41 of a standard type which is normally operative to prevent rotation of the shaft 33. A solenoid 42 is connected as at 43 to the brake band and is operative when energized for releasing the brake from the drum 40.

Means to be described operate to close the circuit to the motor 32, and a limit switch indicated as a whole by the numeral 44 is operative for maintaining a circuit through the motor through a complete cycle of operation, and then to disconnect the motor from the source to place the apparatus in proper condition for the next cycle of operation. The limit switch may be of any desired type and is illustrated in Figure 6 as comprising a split ring contact 45 engageable by a brush 46. This brush is connected with a shaft 47 which carries a sprocket 48. A chain 49 passes around the limit switch sprocket and about a sprocket 50 carried by the motor shaft 33.

The mechanism referred to is operative for driving and controlling the chain 28 in order that an article on the main conveyor, when arranged over the chains 28 may be moved transversely for discharge to the take-off conveyor 16. For the purpose of effecting transverse movement of the articles, the form of the apparatus shown in Figures 1 to 6 inclusive is provided with transverse pushers or articles engaging members 51 connected across the chains 28 as shown in Figures 1, 3 and 5. These pushers are normally arranged in a position out of the path of travel of articles on the main conveyor so that such articles are free to travel past the take-off point once the take-off chains are operated and it will be noted that the take-off chains themselves are arranged below the top plane of the rollers 13, as shown in Figure 3.

Means controllable by the carrier are provided for effecting operation of the take-off means. Referring to Figures 3 and 5, the numeral 52 designates a carrier adapted to carry a plurality of upstanding keys 53 which may be arranged in selected positions along the top of the carrier in accordance with the desired destinations of the carrier, travel on the take-off conveyor in the same position with respect thereto as it travels along the main conveyor, and for this reason the modified form of the invention has been provided for the purpose of turning the carrier at the take-off point. Aside from the specific take-off means, the modified form of the invention is substantially identical with the form of take-off mechanism previously described, and need not be referred to in detail.

Referring to Figures 7 and 8, the numerals 100 and 101 designate take-off chains substituted for the chains 28 previously described. In fact, the chain 101 may be identical with one of the chains 28, and the chains of the modified form of the apparatus are provided with a transverse pusher 102. However, one of the chains, namely the chain 100, varies materially from the previously described take-off chain in that it is provided with a series of article engaging elements adapted to effect the turning movement of the carrier. In the form of the invention illustrated, certain successive opposite links of the chain 100 preceding the pusher 102 are provided with upwardly projecting connecting members 103 acting as article or carrier engaging members. The first of these members is normally arranged out of the path of travel of articles on the main conveyor, as shown in Figure 8.

In the form of the invention shown in Figure 8, guiding and supporting means for the pusher chains also is employed, and this means also is preferably used in the form of the invention previously described. Referring to Figures 8 and 9 it will be noted that certain of the links of the chains 100 and 101 are provided with inwardly projecting members 104 adapted to engage guide rods 105 connected between the side rails of the main conveyor. These guide rods serve to guide and support the upper runs of the chains, as will be apparent.

The operation of the apparatus is as follows:

Assuming that a carrier 52 is traveling along the main conveyor in the direction of the arrow shown in Figures 1 and 5, and that the carrier is provided with keys corresponding in position to the trip arms 54 of the take-off conveyor illustrated, it will be apparent that the trip arms will be actuated by the keys just before the carrier reaches a position directly centered with respect to the take-off chains. The actuation of the trip arms causes actuation of the transfer mechanism, and before the latter becomes effective, the carrier will have traveled to a point properly centered over the take-off chains before the latter function to move the carrier transversely from the main conveyor.

Referring to Figure 6 it will be noted that actuation of the trip arms 54 closes the switches 61, and current will flow from the source 64 through wire 63, switches 61 and wire 65, wire 66 to the motor 32, and thence through wire 67, solenoid 42 and wires 68 and 69 to the source 64. Thus operation of the motor 32 will be initiated, and after its shaft has turned for a short interval of time, the shaft 47 will be actuated sufficiently to bring the brush 46 into engagement with the contact 45. Under such conditions the current will be shunted across the wires 63 and 66 to cut out the switches 61 and the latter are permitted to open without disturbing the circuit through the motor 32. In this connection it will be noted that the solenoid 42 is energized simultaneously with the motor to release the brake 41, and as soon as the motor is deenergized the solenoid 42 likewise will be deenergized and the brake 41 will be automatically applied to promptly stop the shaft 33 and the elements driven thereby.

It will be apparent that the circuit through the motor 32 and solenoid 42 will be maintained closed as long as the brush 46 engages the contact 45. The elements of the switch 44 are so designed that the switch arm 46 will again reach the gap in the ring 45 when one cycle of operation has been completed, that is, after one of the pushers 51 has moved entirely across the path of the main conveyor and has discharged the article to the take-off conveyor, and the next pusher 51 has been moved to a position ready to repeat the operation referred to. Accordingly the circuit will be automatically broken at the proper point when the brush 46 reaches the gap in the ring 45, at which time the motor 32 will stop and the brake 41 will be applied.

In the embodiment of the invention illustrated in Figures 1 to 6 inclusive, the supply and take-off conveyors are arranged in a common vertical plane except adjacent their intersections with the main conveyor, and for this reason the inclined portion 20 of the take-off conveyor is provided so that the main portion of the take-off conveyor may lie beneath the supply conveyor. Articles discharged to the take-off conveyor will move downwardly along the inclined portion 20, thence over the plate 21, and over the succeeding rollers of the take-off conveyor to their desired point of destination. The portion 19 of the take-off conveyor may be horizontal with the rollers thereof positively driven, or the conveyor may be sufficiently inclined to permit the use of gravity rollers.

It will be apparent that articles fed to the supply conveyor will move thereover to the main conveyor to be carried therealong. Assuming however, that there is danger of colas will become apparent. A pair of trip members 54 is associated with each discharge station to be engaged by the keys 53, when the latter are arranged in positions corresponding to the trip members 54 for initiating the operation of the transfer means previously described.

A pair of supports 55 extend upwardly adjacent each discharge point and carry a shaft 56 at their upper ends. The trip members 54 are rotatably supported by the shaft 56 to be operated by the keys 53. Each trip member 54 is provided with an upstanding arm 57 connected by a link 58 to an operating arm 59 associated with a switch indicated as a whole by the numeral 60. It will be apparent that when the system is used in connection with only a few discharge stations, only a single trip arm 54, together with its associated elements, need be employed, but where a greater number of discharge stations are desired, two of the key operated mechanisms are employed in order that a greater number of operable combinations may be obtained, as will be apparent.

Each switch mechanism 60 includes a switch arm 61, as shown in Figure 6, and each is movable to engage a contact 62. One of the switches 61 is connected by a wire 63 to a source of current 64, while the contact 62 of such switch is connected by a wire 65 to the other switch 61. The contact 62 of the second switch is connected to one end of a wire 66, and the other end of this wire is connected to one terminal of the motor 32. The other terminal of the motor is connected by a wire 67 to one terminal of the solenoid 42. The other terminal of the solenoid is connected to one end of a wire 68, and this wire, in turn, is connected to the other side of the source by a wire 69.

It will be apparent that energization of the motor requires that both switches 61 be operated, and accordingly the operation is dependent upon the proper arrangement of both of the keys 53. Such operation only momentarily closes the circuit through the motor and through the solenoid 42, however, and the switch 44 is employed for maintaining the circuit closed for the proper length of time. The switch arm 46 is normally arranged in the gap between the ends of the ring 45, but upon initial actuation of the motor, the brush 46 engages the contact 45 and remains in engagement therewith through a complete cycle of operation. This switch is arranged in parallel with the switches 61, as shown, the brush 46 being connected by a wire 70 to the wire 63, while the ring contact 45 is connected to the wire 66 by a wire 71.

A carrier traveling on the main conveyor may or may not be discharged at a given take-off conveyor, and assuming that it passes such conveyor, it is desirable to prevent the article from being interfered with by an article moving to the main conveyor from the corresponding supply conveyor. Accordingly means are provided for preventing such interference. Referring to Figure 2, the numeral 72 designates horizontal supporting means secured to the upper ends of legs 73 and carrying a pair of vertical bearings 74. Vertical rods 75 are slidable in these bearings and carry pick-up plates or elevating members 76 at their upper ends. The plates 76 are elongated transversely of the supply conveyor and are arranged between certain of the rollers 22, as shown in Figure 1. These plates normally are arranged slightly below the top plane of the rollers 22 as clearly shown in Figure 2.

The lower ends of the rods 75 are connected by a cross member 77 to which is connected a pin 78. A lever 79 is pivotally supported as at 80 by a depending bracket 81 carried by the support 72. The lever is provided in one end with a slot 82 receiving the pin 78, and the inner end of the lever is normally urged downwardly by a spring 83. A solenoid 84 is provided with armatures 85 pivotally connected to the other end of the lever 79 as at 86.

Energization of the solenoid 84 takes place when an article moving along the main conveyor reaches a point adjacent the supply conveyor, and an article on the latter conveyor over the plates 76 will be raised thereby and prevented from moving from the main conveyor until after the article on the latter has passed an intersecting point of the main and supply conveyors. To effect this operation, one of the rollers 13 is replaced by a similar roller 87 journalled in a frame 88 pivotally supported between the rails 11 and 12 as at 89. An arm 90 carried by the frame 88 is pivotally connected to the upper end of a link 91, and the lower end of this link operates an arm 92 associated with a switch indicated as a whole by the numeral 93. The switch 93 includes a switch arm 94 normally arranged in the position shown in Figure 6, and movable upon actuation of the roll 87 to engage contacts 95 and 96. The contact 95 is connected to the wire 63 by a wire 97, while the contact 96 is connected by a wire 98 to one terminal of the solenoid 84. The other terminal of the solenoid is supplied with current from the source through a wire 99 connected to the wire 69.

A somewhat modified form of the invention is shown in Figures 7 and 8. In the form of the invention previously described, the article or carrier moves from the main conveyor to a take-off conveyor without altering its relative position, that is, without being turned at the take-off point. It is sometimes desirable to cause a carrier to lision between an article moving on the main conveyor and an article moving toward such conveyor over the supply conveyor, the plates 76 will be elevated to prevent such collision. The plates 76 and the floating roll 87 are substantially equidistantly spaced from the intersecting point of the main and supply conveyors. Articles passing over such points simultaneously would interfere with each other if both were permitted to continue their movement, but under such conditions, with the present construction, the article on the main conveyor will depress the roller 87 and actuate the switch arm 94 to bridge across the contacts 95 and 96.

Under the conditions referred to current will flow from the source 64 through wires 63 and 97, across the contacts 95 and 96, through wire 98 and solenoid 84 and thence back to the source through wires 99 and 69. The solenoid 84 accordingly will be energized to pull the adjacent end of the lever 79 downwardly and thus elevate the cross member 77, posts 75 and plates 76 and an article arranged over these plates will be elevated thereby to the dotted line position shown in Figure 2. The solenoid 84 is of the delayed return type, and accordingly the article or carrier lifted from the rollers 22 will be maintained out of engagement therewith for a sufficient length of time to permit the article on the main conveyor to move forwardly a sufficient distance to eliminate danger of interference between the two articles at the intersecting point.

The take-off means illustrated in Figures 7 and 8 operates in identically the same manner with the form previously described except that the carrier will be turned to an angle of 90 degrees before being discharged. Upon actuation of the motor 32, the chains 100 and 101 will be actuated, and the engaging elements 103 will advance into engagement with the approaching end of the carrier to effect turning movement thereof as shown in dotted lines in Figure 7. The succession of the elements 103 provides a barrier against further movement of the article or carrier along the main conveyor, and thus the pusher 102 will come into engagement with the carrier after it has been turned and will move it transversely for discharge to the take-off conveyor.

From the foregoing it will be apparent that the present apparatus provides novel means for effecting transfer of articles or carriers at right angles from a main conveyor to a branch conveyor, either with or without turning the article during such action. The apparatus, moreover, provides a novel arrangement which permits the use of adjacent take-off and supply conveyors at intermediate points along the main conveyor, with means for preventing any interference between articles on the main conveyor and articles moving thereto from the supply conveyor. The apparatus also includes novel means for effecting the automatic completion of a cycle of operation at each time an article is to be transferred from the main to the take-off conveyor.

It is to be understood that the forms of the invention herewith shown and described are to be taken as preferred examples of the same and that various changes in the shape, size and arrangement of parts may be resorted to without departing from the spirit of the invention or the scope of the subjoined claims.

We claim:

1. A conveying system comprising a main conveyor, means movable over said main conveyor for effecting the removal of an article from the main conveyor substantially transversely thereof and normally arranged out of the path of travel of articles on the main conveyor, an electric motor connected to said means and operative for causing the latter to operate through a complete cycle to effect removal of an article from the main conveyor and then return to normal position, a switch for the circuit of said motor, and a holding circuit operative for causing the motor to complete a cycle of operation upon the closing of said switch.

2. A conveying system comprising a main conveyor, a pusher member arranged substantially parallel to said main conveyor and movable substantially horizontally transversely thereof to remove articles therefrom, and means movable substantially horizontally transversely of the main conveyor and operative in advance of said pusher member for engaging and turning an article transversely prior to the removal thereof by said pusher member.

3. A conveying system comprising a main conveyor, a pusher member arranged substantially parallel to said main conveyor and movable substantially horizontally transversely thereof to remove articles therefrom, driving means for said pusher member, and means connected to said driving means and movable substantially horizontally across the main conveyor in advance of said pusher member for engaging and turning an article prior to the removal thereof by said pusher member.

4. A conveying system comprising a main conveyor, a pusher member arranged substantially parallel to said main conveyor and movable substantially transversely thereof to remove articles therefrom, a pair of endless driving members for said pusher member, and means connected to one of said driving members and operative in advance of said pusher member for engaging and turning an article prior to the removal thereof by said pusher member.

5. A conveying system comprising a main conveyor, a pusher member arranged substantially parallel to said main conveyor and movable substantially transversely thereof to remove articles therefrom, a pair of endless driving members for said pusher member, means normally arranged out of the path of travel of articles on the main conveyor and connected to one of said driving members, said last named means being operative in advance of said pusher member for engaging and turning an article prior to the removal thereof by said pusher member, and power means for actuating said driving members and returning said last named means to normal position.

6. A conveying system comprising a main conveyor, a pair of parallel endless driving members extending across said main conveyor, an elongated pusher member connected to both of said driving members and operative thereby for removing an article from the main conveyor substantially transversely thereof, a source of power for said driving members, and a plurality of article engaging elements carried by one of said driving members in advance of said pusher member and operative for engaging and turning an article on the main conveyor prior to the engagement of the pusher member with the article, said pusher member and said engaging elements being normally inoperative and out of the path of travel of articles on the main conveyor.

7. Apparatus constructed in accordance with claim 6 wherein said source of power comprises an electric motor, and control means for said motor comprising a circuit having a switch therein, and a holding circuit rendered operative upon the closing of said switch for effecting operation of said driving members and then returning said pusher member and said engaging elements to normal position.

8. A conveying system comprising a main conveyor, an intermediate take-off conveyor connected to said main conveyor, selectively operated means for effecting the transfer of articles of a certain class from the main to the take-off conveyor, a supply conveyor connected to said main conveyor at a point beyond said take-off conveyor, and means operative by an article of any other class on the main conveyor between the take-off and supply conveyors for preventing an article on the supply conveyor adjacent the main conveyor from being moved to the latter.

9. A conveying system comprising a main conveyor, an intermediate take-off conveyor connected to said main conveyor, selectively operated means for effecting the transfer of articles of a certain class from the main to the take-off conveyor, a supply conveyor connected to said main conveyor at a point beyond said take-off conveyor, means in said supply conveyor adjacent the main conveyor operative for elevating an article above the supply conveyor to prevent its movement therealong, and means operative by an article of any other class on the main conveyor between the take-off and supply conveyors for actuating said last named means.

10. A conveying system comprising a main conveyor, a supply conveyor connected to the main conveyor intermediate the ends thereof and including parallel load supporting rollers, a pair of elevating members arranged between pairs of said rollers and parallel thereto, said elevating members being normally arranged below the path of travel of articles on the supply conveyor, a floating roll arranged in said main conveyor and movable downwardly by an article passing thereover, said floating roll and said elevating members being arranged approximately the same distance from the junction of said main and supply conveyors, and means operative by said floating roll upon depression thereof for actuating said elevating members for lifting an article thereover wholly above the supply conveyor.

11. A conveying system comprising a main conveyor, means movable over said main conveyor for effecting the removal of an article from the main conveyor substantially transversely thereof and normally arranged out of the path of travel of articles on the main conveyor, a power source connected to said means and operative for causing the latter to operate through a complete cycle to effect removal of an article from the main conveyor and then return to normal position, a key adapted to be carried by an article moving on the main conveyor, a member operable by said key for initiating the operation of said power source, and control means for said source of power for automatically causing it to operate through a cycle of movement after its operation has been initiated by said member.

In testimony whereof we affix our signatures.

HENRY R. GOTTHARDT.
WILLIAM E. CAIN.